(12) United States Patent
Finn et al.

(10) Patent No.: US 11,159,367 B2
(45) Date of Patent: Oct. 26, 2021

(54) APPARATUSES AND METHODS FOR ZERO TOUCH COMPUTING NODE INITIALIZATION (71) Applicant: Nutanix, Inc., San Jose, CA (US)

(72) Inventors: Brian Finn, South Lake Tahoe, CA (US); Jan Olderdissen, Herrenberg (DE); Jaspal Singh Dhillon, Bengaluru (IN); Mengyang Li, San Jose, CA (US); Sragdhara Datta Chaudhuri, Bangalore (IN); Toms Varghese, Thiruvalla (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/980,321

(22) Filed: May 15, 2018

(65) Prior Publication Data
US 2019/0356541 A1 Nov. 21, 2019

(51) Int. Cl.
H04L 12/24 (2006.01)
H04L 29/12 (2006.01)
(Continued)

(52) U.S. Cl.
CPC ...... H04L 41/0806 (2013.01); G06F 9/45558 (2013.01); H04L 61/1511 (2013.01);
(Continued)

(58) Field of Classification Search
CPC ............. H04L 41/0806; H04L 61/1511; H04L 61/2015; H04L 67/1097; G06F 9/45558
See application file for complete search history.

(56) References Cited

U.S. PATENT DOCUMENTS 7,920,549 B2 * 4/2011 Alt ...................... H04L 63/0281
370/352
8,429,276 B1 * 4/2013 Kumar ................ G06F 9/45533
709/226

(Continued)

FOREIGN PATENT DOCUMENTS

WO 2019222262 A1 11/2019

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

Primary Examiner — Sm A Rahman
(74) Attorney, Agent, or Firm — Dorsey & Whitney LLP (57) ABSTRACT Examples described herein includes initialization of a computing node cluster. An example method providing a query request from an initialization application/service of a computing node for a default configuration management server identifier via a network, and receiving, from a network management server, an internet protocol address associated with the default configuration management server identifier. The example method further includes providing a configuration request from the computing node to the internet protocol address requesting configuration information, and receiving the configuration information at the computing node from a configuration management server associated with the internet protocol address.

20 Claims, 6 Drawing Sheets (51) Int. Cl.
  *G06F 9/455* (2018.01)
  *H04L 29/08* (2006.01)
(52) U.S. Cl.
  CPC ...... *H04L 61/2015* (2013.01); *H04L 67/1097*
  (2013.01); *G06F 2009/45595* (2013.01)

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,656,018 | B1 | 2/2014 | Keagy et al. |
| 8,726,274 | B2 | 5/2014 | Pafumi et al. |
| 8,776,050 | B2 * | 7/2014 | Plouffe .................. G06F 9/505 |
| | | | 718/1 |
| 8,850,130 | B1 | 9/2014 | Aron et al. |
| 8,863,124 | B1 | 10/2014 | Aron |
| 8,938,523 | B2 | 1/2015 | Jaroker |
| 9,009,106 | B1 | 4/2015 | Aron et al. |
| 9,027,087 | B2 * | 5/2015 | Ishaya .................... G06F 9/468 |
| | | | 726/4 |
| 9,069,708 | B2 | 6/2015 | Gill et al. |
| 9,135,145 | B2 * | 9/2015 | Voccio ................ G06F 11/3612 |
| 9,152,447 | B2 * | 10/2015 | Venkat .................... G06F 3/067 |
| 9,336,132 | B1 | 5/2016 | Aron et al. |
| 9,426,026 | B2 | 8/2016 | Rider |
| 9,426,030 | B1 | 8/2016 | Anerousis et al. |
| 9,652,265 | B1 | 5/2017 | Narayanasamy et al. |
| 9,716,624 | B2 | 7/2017 | Zeyliger et al. |
| 9,747,287 | B1 | 8/2017 | Bhardwaj et al. |
| 9,772,866 | B1 | 9/2017 | Aron et al. |
| 10,120,725 | B2 | 11/2018 | Jubran et al. |
| 10,191,757 | B2 | 1/2019 | Venkataramaiah et al. |
| 10,284,642 | B2 * | 5/2019 | Shanley .............. G06F 9/45558 |
| 2005/0120160 | A1 * | 6/2005 | Plouffe ................. G06F 9/4856 |
| | | | 711/1 |
| 2005/0169195 | A1 | 8/2005 | Luo et al. |
| 2006/0143432 | A1 | 6/2006 | Rothman et al. |
| 2006/0155674 | A1 | 7/2006 | Traut et al. |
| 2010/0017597 | A1 | 1/2010 | Chandwani |
| 2011/0075591 | A1 | 3/2011 | Cheshire |
| 2012/0150985 | A1 | 6/2012 | Marion et al. |
| 2012/0207291 | A1 | 8/2012 | West et al. |
| 2013/0227144 | A1 | 8/2013 | Saito et al. |
| 2013/0287026 | A1 | 10/2013 | Davie |
| 2014/0156824 | A1 | 6/2014 | Biswas et al. |
| 2015/0096011 | A1 | 4/2015 | Watt |
| 2015/0134791 | A1 | 5/2015 | Cohn et al. |
| 2015/0271014 | A1 | 9/2015 | Madama |
| 2015/0341189 | A1 * | 11/2015 | Zhang ................... H04W 24/02 |
| | | | 370/338 |
| 2015/0363724 | A1 | 12/2015 | Chatterjee et al. |
| 2015/0365323 | A1 | 12/2015 | Duminuco et al. |
| 2016/0006607 | A1 | 1/2016 | Wang et al. |
| 2016/0212044 | A1 | 7/2016 | Danforth |
| 2016/0255045 | A1 | 9/2016 | Kolesnik et al. |
| 2017/0223053 | A1 | 8/2017 | Dhanabalan et al. |
| 2018/0129524 | A1 | 5/2018 | Bryant et al. |
| 2018/0367530 | A1 | 12/2018 | Mistry |
| 2018/0375921 | A1 | 12/2018 | Wang et al. |
| 2019/0166032 | A1 | 5/2019 | Inbaraj et al. |
| 2019/0188021 | A1 | 6/2019 | Finn et al. |
| 2019/0356541 | A1 | 11/2019 | Finn et al. |
| 2020/0044917 | A1 | 2/2020 | Peng |
| 2021/0152420 | A1 | 5/2021 | Sidhartha et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, Ignacio et al. "Curator: Self-Managing Storage for Enterprise Clusters"; University of Washington; published Mar. 2017; pp. all.
International Search Report and Written Opinion received in PCT/US2019/032284 dated Aug. 23, 2019; pp. all.
Abhilash, G. B. "VMware vSphere 5.5 Cookbook", Packt Publishing, Limited, Olton Birmingham, Feb. 27, 2015, pp. all.
U.S. Appl. No. 16/689,870 titled "Apparatuses and Methods for Remote Computing Node Initialization Using a Configuration Template and Resource Pools" filed Nov. 20, 2019, pp. all.
U.S. Appl. No. 16/681,628 titled "Apparatuses and Methods for Remote Computing Node Registration and Authentication" filed Nov. 12, 2019, pp. all.
"Cisco HyperFlex Edge 4.0 with Cisco Intersight—Deployment Guide for HyperFlex Edge Systems with Cisco Intersight Cloud Management Platform and VMware ESXi", Cisco, Oct. 11, 2019, pp. 68-96.
"Deployment—VMware Validated Design for Remote Office Branch Office 4.3", VMware Validated Design 4.3, VMware Validated Design for Remote Office Branch Office 4.3, Sep. 25, 2018, pp. 34-36.
"Smartprovisioning R76 Administration Guide", Check Point: Software Technologies LTD, Feb. 7, 2013, pp. 87-97.

* cited by examiner

APPARATUSES AND METHODS FOR ZERO TOUCH COMPUTING NODE INITIALIZATION

TECHNICAL FIELD

Examples described herein relate generally to distributed computing systems. Examples of virtualized systems are described. Examples of initialization of distributed computing systems is described herein.

BACKGROUND

A virtual machine (VM) is a software implementation of a physical computer, which can run its own operating system and applications on the underlying physical resources just like a real computer.

Virtualization generally works by inserting a thin layer of software directly on the computer hardware or on a host operating system. This layer of software contains a virtual machine monitor or "hypervisor" that allocates hardware resources to virtual machines. Multiple operating systems may run concurrently on a single physical computer and share hardware resources with each other. By encapsulating an entire machine, including CPU, memory, operating system, and network devices, a virtual machine may be completely compatible with most standard operating systems, applications, and device drivers. Most modern implementations allow several operating systems and applications to safely run at the same time on a single computer, with each having access to the resources it needs when it needs them.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine may not be utilized to perform useful work. This may be wasteful and inefficient if there are users on other physical machines which are currently waiting for computing resources. Virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Many businesses maintain small information technology (IT) infrastructure installations in remote sites, like branch offices and retail stores (e.g., remote office, branch office (ROBO) sites). In some instances, businesses may reduce IT costs by maintaining a skilled IT team in one location, and remotely manage ROBO sites using the Internet or other network connectivity. Conventionally, deploying and configuring a complex distributed software application at a ROBO site requires skilled IT staff be physically present. It can be difficult and expensive to hire or temporarily deploy IT staff at ROBO sites.

DETAILED DESCRIPTION

This disclosure describes embodiments for distributed software application initialization of one or more computing servers at ROBO sites. The one or more computing servers may load an initialization application/service to contact a configuration server to retrieve node configuration information for a given application. This initialization process has historically required IT personnel to be physically present to manage installation and configuration of the node. An ability to direct the node to a configuration server for installation and configuration of a node may reduce a need to deploy IT professionals to ROBO sites to manage installation and configuration of new nodes. In some examples, after power-up, the new node running the initialization application/service may automatically attempt to connect to a local area network (LAN) and obtain an internet protocol (IP) address. After assignment of the IP address, the new node may attempt to connect to a configuration server. In some examples, the new node attempt to connect to the configuration server using a preset host identifier. In other examples, the host identifier may be provided during assignment of the IP address. The configuration server may use identifying information associated with the new node (e.g., media access control (MAC) address, serial number, model number, etc.) to determine an associated configuration, and may send software images and configuration information associated with the configuration.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
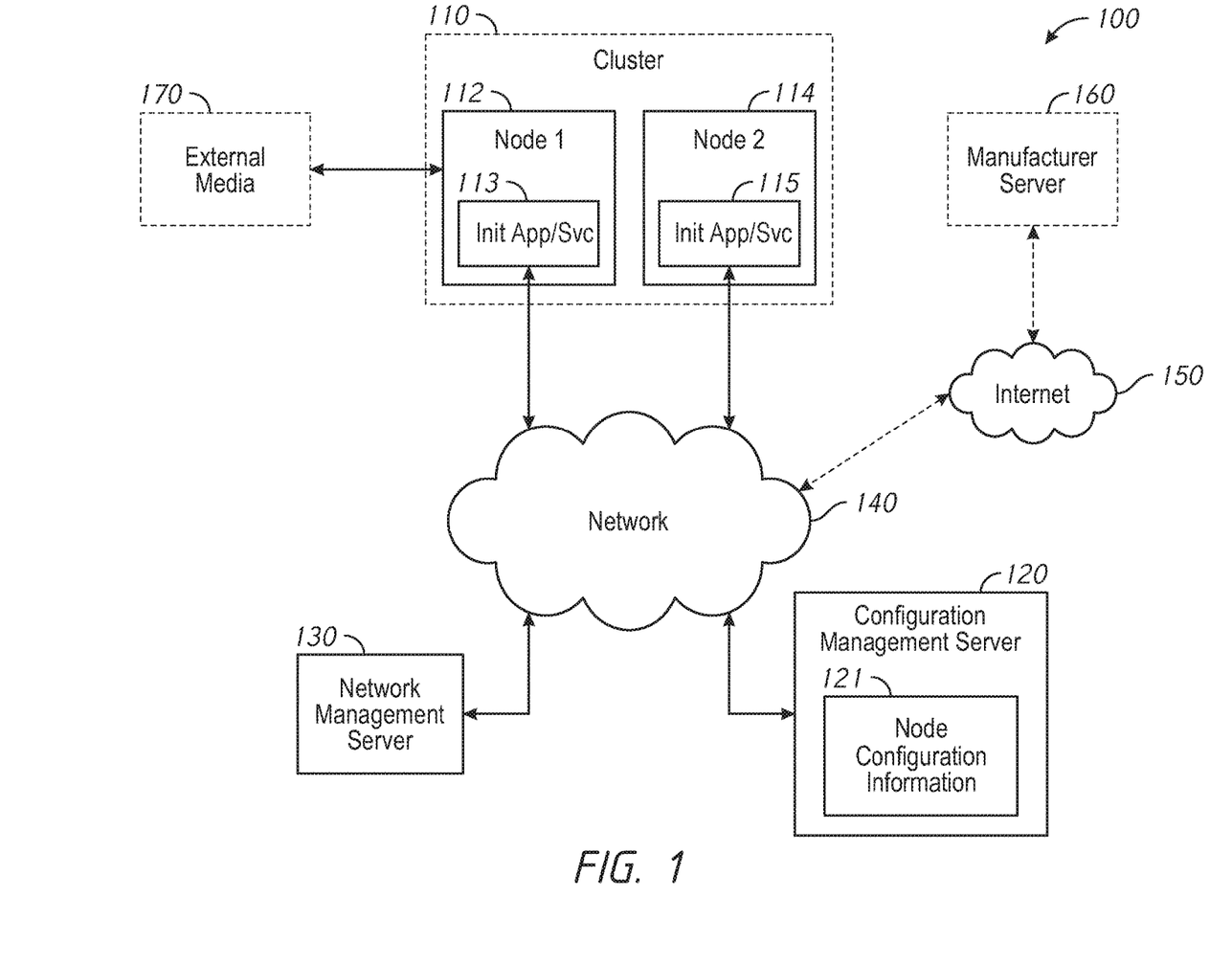
FIG. 1 is a block diagram of a wide area computing system 100, in accordance with an embodiment of the present disclosure.

FIG. 1 is a block diagram of a wide area computing system 100, in accordance with an embodiment of the present disclosure. The wide area computing system of FIG. 1 includes a computing node cluster 110 connected to a network management server 130 and a configuration management server 120 via a network 140. The computing nodes 112 and/or 114 may include, for example, a server computer, a laptop computer, a desktop computer, a tablet computer, a smart phone, or any other type of computing device. In some examples, the network 140 may connect to a manufacturer server 160 via the internet 150. The network 140 may include any type of network capable of routing data transmissions from one network device (e.g., the computing server cluster 110, the configuration management server 120, the network management server 130, and/or the manufacturer server 160) to another. For example, the network 140 may include a local area network (LAN), wide area network (WAN), intranet, or a combination thereof. The network 140 may be a wired network, a wireless network, or a combination thereof.

The computing server cluster 110 may include a computing server 112 and a computing node 114. More than two computing nodes may be included in the computing node cluster 110 without departing from the scope of the disclosure. Each of the computing node 112 and computing node 114 may include an initialization application/service 113 and an initialization application/service 115, respectively. The computing node 112 and the computing node 114 may work together within the computing node cluster 110 to perform a function, such as a distributed file server, a backup system, etc. In some examples, the computing node 112 may be a primary computing node and the computing node 114 may be secondary computing node. The computing node 112 and the computing node 114 may be applied to other use cases, without departing from the scope of the disclosure. Because the computing node 112 and the computing node 114 of the computing node cluster 110 may perform different functions for different installations, each of the computing node 112 and the computing node 114 include software and firmware, support permissions, contracts, assigned policies, and update procedures specific to the application. Further, operation of the computing node 112 and the computing node 114 may rely on a level of compatibility between software builds to facilitate successful communication between the computing node 112 and the computing node 114, and between the computing node cluster 110 and the and the configuration management server 120. To initiate loading of the software and firmware, support permissions, contracts, assigned policies, and update procedures specific to the application, the initialization applications/services 113 and/or 115 may initiate contact with the configuration management server 120 to receive the information.

The configuration management server 120 may communicate with the computing node cluster 110 via the network 140. The configuration management server 120 operates configuration and/or infrastructure management software to manage configuration of the computing server cluster 110. The configuration management server 120 may include node configuration information 121 that provides information for computing nodes 112 and 114 of the computing node cluster 110. The node configuration information 121 may include software images, firmware, network configuration settings, policies, licenses, support contracts, update procedures, any combination thereof, etc. When initially contacted by the computing node 112 or the computing node 114, the configuration management server may select the node configuration information 121 to provide to the computing node 112 or the computing node 114 based on one or more identifiers (e.g., model numbers, IP addresses, MAC addresses, serial numbers, etc.) associated with the computing node 112 or the computing node 114. The configuration management server 120 may provide the selected the node configuration information 121 to the computing node 112 or the computing node 114 load operational software based on the node configuration information 121.

The network management server 130 may be a discrete hardware component or device, or may be distributed in one or more other devices connected to the network 140, such as the configuration management server 120. The network management server 130 may include a DHCP server that uses DHCP to assign network resources to the computing nodes 112 and the 114. As part of the DHCP, the network management server 130 may provide information for connection to the configuration management server 120 via specified fields in DHCP packets. In some examples, the network management server 130 may also include a domain name server (DNS) that provides mapping between host identifiers and internet resources, such as internet protocol (IP) addresses. The computing nodes 112 and 114 may attempt to connect to the configuration management server 120 using a default (e.g., pre or hard-programmed) host identifier, and the network management server 130 may resolve that default host identifier to the IP address associated with the configuration management server 120. The default host identifier may be programmed into the initialization application/services 113 and/or 115, and may include well-known host identifiers, such as uniform resource locator.

In some examples, initialization of the computing nodes 112 and 114 may be managed by the manufacturer server 160 via the internet 150. The manufacturer server 160 may store the node configuration information 121, and may select the node configuration information based on the one or more identifiers associated with the computing nodes 112 and 114.

In operation, the computing node cluster 110 may be in physically remote location from the configuration management server 120. Conventional installation of the computing node cluster 110 may be difficult and/or expensive, as options may include hiring personnel to be physically present to manage the computing node cluster 110, or sending existing personnel to the computing node cluster 110 to manage the computing node cluster 110. To mitigate the conventional expense, the computing nodes 112 and 114 running the initialization applications/services 113 and 115, respectively, may contact and communicate with the configuration management server 120 to facilitate transfer of the node configuration information 121, which may include selected software images, support contracts, licenses, assigned policies, update procedures, marketing information, etc., to each of the computing node 112 and the computing node 114 for installation. In some examples, if the computing nodes 112 or 114 are not loaded with images for the initialization application/services 113 or 115, the computing nodes 112 or 114 may load the images to load and boot the initialization application/services 113 or 115 from the external media 170.

The initial contact of the configuration management server 120 by the computing node 112 and the computing node 114 may be handled through the network management server 130, in some examples. For example, the network management server 130 may include a DHCP server that uses DHCP to assign network resources to the computing nodes 112 and the 114. As part of the DHCP, the computing nodes 112 and 114 and the network management server 130 trade packets, with each of the computing nodes 112 and 114 sending a respective discovery packet. The network management server 130 may receive the respective discovery packets and may transmit respective offer packets that each include a respective offer of various parameters associated with connection to the network 140, such as an offered IP address, server, gateway, and client IP addresses, lease time, DHCP server IP address, etc. The computing nodes 112 and 114 may each provide a respective request packet back to the network management server 130 that requests the respective offered IP address. In response to the respective request packets, the network management server 130 may provide respective acknowledgment packets to the computing nodes 112 and 114. The acknowledgment packets may include an assigned IP address, server, gateway, and client IP addresses, lease time, DHCP server IP address, etc. One of the offer packets or the acknowledgment packets may also include an IP address for contacting the configuration management server 120 in a designated field. In some examples, the computing nodes 112 and 114 may include a request for the IP address associated with the configuration management server 120 in one of the packets, such as a request in the discovery or request packets, and the network management server 130 may provide the IP address in one of the packets. In some examples, the DHCP server may be configured to include a custom option that includes a custom option name (e.g., configuration_server_ip) and code that is used to request the configuration management server, and the computing nodes 112 and 114 include the custom option name or code in one of the DHCP packets to request the IP address for the configuration management server 120. In another example, an existing option name and code may be used to request the IP address for the configuration management server 120. The computing nodes 112 and 114 may retrieve the IP address associated with the configuration management server 120 and may use the retrieved IP address to initiate contact with the configuration management server 120.

In another example, the network management server 130 may include a DNS that provides mapping between host identifiers and internet resources. The computing nodes 112 and 114 may attempt to connect to the configuration management server 120 via a default host identifier (e.g., configure.nutanix.com), and the network management server 130 may resolve that default host identifier to the IP address associated with the configuration management server 120. In some examples, the network management server 130 may employ both DHCP and DNS servers/functions. For example, computing nodes 112 and 114 may include a request for the IP address associated with the configuration management server 120 in one of the DHCP packets. In response to a failure of the DHCP server/function to provide the IP address associated with the configuration management server 120, the computing nodes 112 and 114 may attempt to connect to the configuration management server 120 via a default host identifier.

Once contact with the configuration management server 120 has been initiated by the computing nodes 112 and 114, the configuration management server 120 may select the node configuration information 121 for the computing nodes 112 and 114 based on the one or more identifiers of the computing nodes 112 and 114. The configuration management server 120 may transfer the node configuration information 121 to one or more of the computing nodes 112 and 114 via the network 140. In some examples where bandwidth in limited via the network 140, such as over a wide area network, the configuration management server 120 may designate one of the computing nodes 112 or 114 as a primary computing node, and may transfer the node configuration information 121 to the primary computing node. The primary computing node may manage transfer of the node configuration information 121 over a local area network to the other computing node 112 or 114. After the computing nodes 112 or 114 are loaded with the node configuration information, the computing nodes 112 or 114 may be brought online and into service. In another example where bandwidth is limited over the network 140, the configuration management server 120 may direct the computing node 112 (or 114) to retrieve the node configuration information from an external media source 170, such as a portable flash drive connected via a universal serial bus (USB) port.

Figure 2:
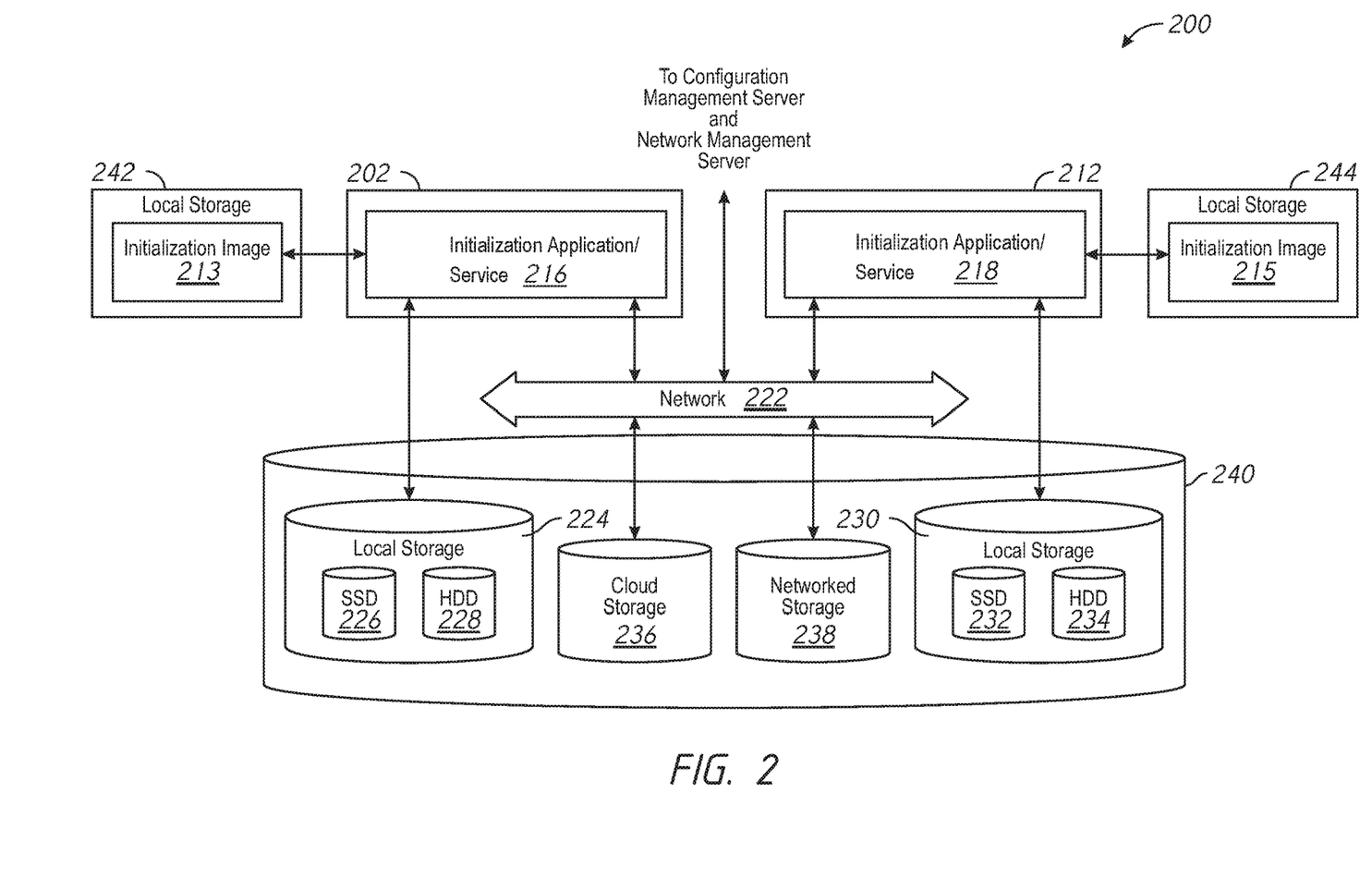
FIG. 2 is a block diagram of a distributed computing system 200 prior to initialization, in accordance with an embodiment of the present disclosure.

FIG. 2 is a block diagram of a distributed computing system 200 prior to initialization, in accordance with an embodiment of the present disclosure. The distributed computing system of FIG. 2 generally includes computing node 202 and computing node 212 and storage 240 connected to a network 222. The network 222 may be any type of network capable of routing data transmissions from one network device (e.g., computing node 202, computing node 212, and storage 240) to another. For example, the network 222 may be a local area network (LAN), wide area network (WAN), intranet, Internet, or a combination thereof. The network 222 may be a wired network, a wireless network, or a combination thereof.

The storage 240 may include local storage 224, local storage 230, cloud storage 236, and networked storage 238. The local storage 224 may include, for example, one or more solid state drives (SSD 226) and one or more hard disk drives (HDD 228). Similarly, local storage 230 may include SSD 232 and HDD 234. Local storage 224 and local storage 230 may be directly coupled to, included in, and/or accessible by a respective computing node 202 and/or computing node 212 without communicating via the network 222. Cloud storage 236 may include one or more storage servers that may be stored remotely to the computing node 202 and/or computing node 212 and accessed via the network 222. The cloud storage 236 may generally include any type of storage device, such as HDDs SSDs, or optical drives. Networked storage 238 may include one or more storage devices coupled to and accessed via the network 222. The networked storage 238 may generally include any type of storage device, such as HDDs SSDs, or optical drives. In various embodiments, the networked storage 238 may be a storage area network (SAN). The computing node 202 is a computing device for hosting VMs in the distributed computing system 200 of FIG. 2. The computing node 202 may be, for example, a server computer, a laptop computer, a desktop computer, a tablet computer, a smart phone, or any other type of computing device. The computing node 202 may include one or more physical computing components, such as processors.

The computing node 202 is configured to execute an initialization service/application 216 loaded via the initialization image 213. The initialization service/application 216 may run on any type of hypervisor (such as ESX, ESX(i), Hyper-V, KVM, or any other type of hypervisor), or on the physical computing node. VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. The initialization service/application 216 manages the allocation of physical resources (such as storage 240 and physical processors) to performs various operations, such as creating connecting to and communicating over the network 222.

The computing node 212 may include an initialization service/application 218. The initialization service/application 218 may be implemented similarly to the initialization service/application 216 of the computing node 202. The initialization service/application 218 may be implemented as described above with respect to the initialization service/application 216. In the embodiment of FIG. 2, the initialization service/application 218 may be a different type of hypervisor than the initialization service/application 216. For example, the initialization service/application 218 may be Hyper-V, while the initialization service/application 216 may be ESX(i).

During operation, the computing nodes 202 and 212 may be initially loaded initialization images 213 and 215 from local storage 242 and 244, respectively, which, on power-up, may be loaded and run as the initialization applications/services 216 and 218, respectively. The initialization applications/services 216 and 218 may be configured to contact a configuration management server (e.g., the configuration management server 120 of FIG. 1) to receive node configuration information for the installed application or implementation. For example, the computing nodes 202 and 212 may receive and load node configuration information that sets up the computing nodes 202 and 212 as nodes of a cluster for a distributed file system or a backup file system or a disaster recovery system.

The initial contact of the configuration management server by the initialization applications/services 216 and 218 may be handled through the network management server (e.g., the network management server 130 of FIG. 1. For example, the initialization applications/services 216 and 218 may contact a DHCP server to receive network resources, as well as receive the IP address associated with the configuration management server via specific fields of one or more of the DHCP packets (e.g., the offer and/or acknowledgement packets). In some examples, the initialization applications/services 216 and 218 may include a request for the IP address associated with the configuration management server in one of the packets, such as a request in the discovery or request packets, and the network management server 130 may provide the IP address in one of the packets. In some alternative examples, the initialization applications/services 216 and 218 may use a DNS that provides mapping between host identifiers and internet resources. That is, the DNS may resolve an IP address for a default host identifier associated with the configuration management server. In some examples, the network management server 130 may employ both DHCP and DNS servers/functions. For example, computing nodes 112 and 114 may include a request for the IP address associated with the configuration management server 120 in one of the DHCP packets. In response to a failure of the DHCP server/function to provide the IP address associated with the configuration management server 120, the computing nodes 112 and 114 may attempt to connect to the configuration management server 120 via a default host identifier.

The initialization applications/services 216 and 218 may use the IP address to contact the configuration management server. Once contact with the configuration management server has been initiated by the initialization applications/services 216 and 218, the configuration management server may select the node configuration information for the computing nodes 202 and 212 based on one or more deniers of the computing nodes 202 and 222, such as an IP address, model number, serial number, MAC address, etc. The configuration management server may transfer the node configuration information to one or more of the computing nodes 202 and 212 via the network 222, either in parallel or serially. In some examples where bandwidth in limited via the 222, such as over a wide area network, the configuration management server may designate one of the computing nodes 202 or 222 as a primary computing node, and may transfer the node configuration information to the primary computing node. The primary computing node may manage loading of the other computing node with the node configuration information. In some examples, the node configuration information may be provided to the computing nodes 202 and/or 212 via an external media device, such as a portable USB flash memory drive.

Figure 3:
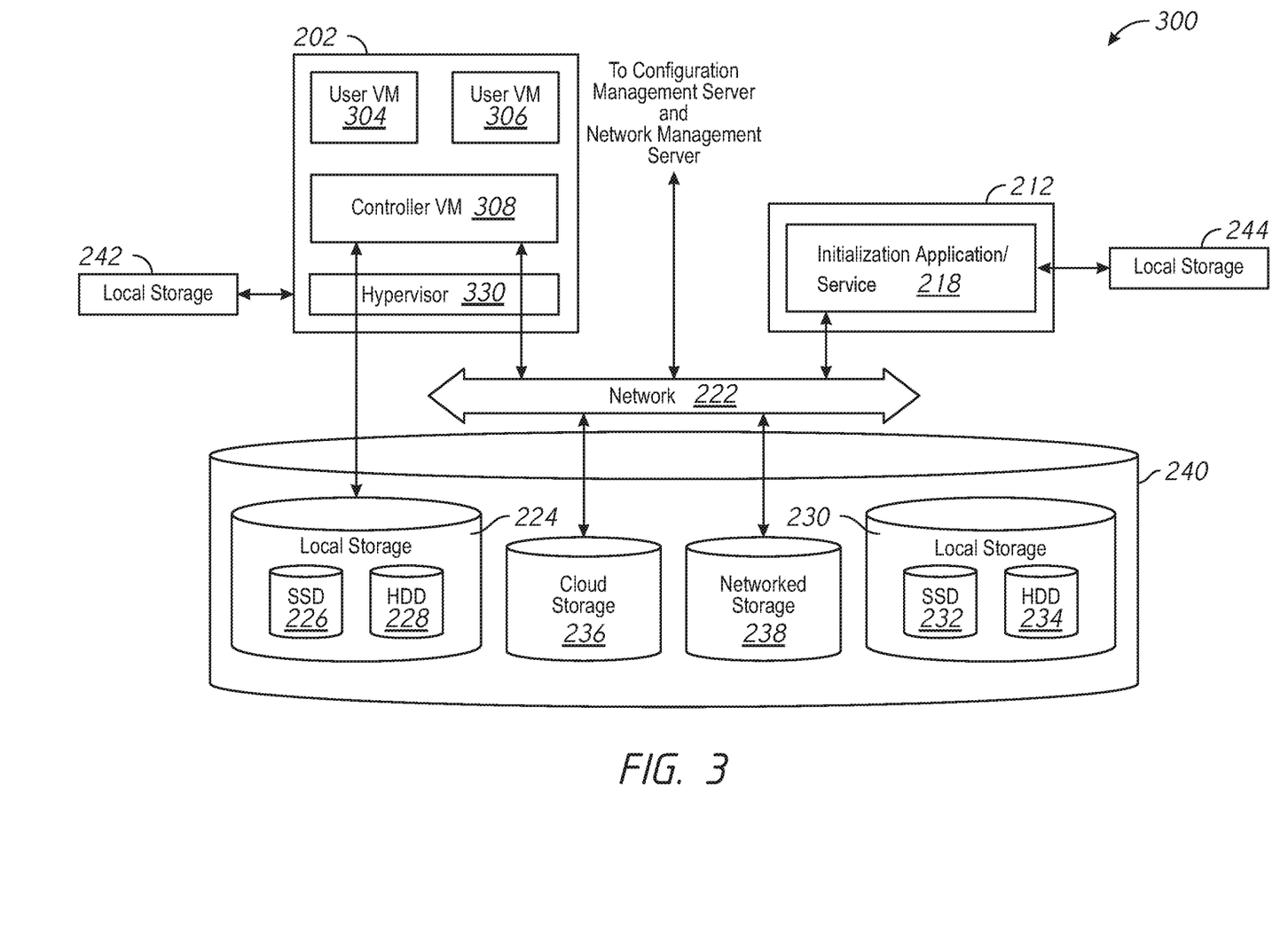
FIG. 3 is a block diagram of a distributed computing system at an intermediate step of initialization during a serial installation, in accordance with an embodiment of the present disclosure.

For example, FIG. 3 is a block diagram of a distributed computing system 300 at an intermediate step of initialization during a serial installation, in accordance with an embodiment of the present disclosure. The distributed computing system 300 may include elements that have been previously described with respect to the distributed computing system 200 of FIG. 2. Those elements have been identified in FIG. 3 using the same reference numbers used in FIG. 2 and operation of the common elements is as previously described. Consequently, a detailed description of the operation of these particular elements will not be repeated in the interest of brevity.

In this example, the computing node 202 may be loaded with the node configuration information. The computing node 212 may be later loaded with the node configuration information, either via the configuration management server or via the computing node 202 when designated as a primary computing node. In this example, the computing node 202 is configured to operationally execute a hypervisor 330, a controller VM 308 and one or more user VMs, such as user VMs 304, 306. The user VMs including user VM 304 and user VM 306 are virtual machine instances executing on the computing node 202. The user VMs including user VM 304 and user VM 306 may share a virtualized pool of physical computing resources such as physical processors and storage (e.g., storage 240). The user VMs including user VM 304 and user VM 306 may each have their own operating system, such as Windows or Linux. While a certain number of user VMs are shown, generally any number may be implemented. User VMs may generally be provided to execute any number of applications which may be desired by a user. The hypervisor 330 may be any type of hypervisor. For example, the hypervisor 330 may be ESX, ESX(i), Hyper-V, KVM, or any other type of hypervisor. The hypervisor 330 manages the allocation of physical resources (such as storage 240 and physical processors) to VMs (e.g., user VM 304, user VM 306, and controller VM 308) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

The controller VM 308, may provide services for the user VMs 304 and 306 in the computing node 202. As an example of functionality that a controller VM may provide, the controller VM 308 may provide virtualization of the storage 240. Controller VMs may provide management of the distributed computing system shown in FIG. 3. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging VM-Direct Path. In the case of Hyper-V, the storage devices may be passed through to the CVM. The controller VM 308 may also manage loading of the node configuration information on the computing node 212, in some examples. After the computing nodes 202 or 212 are loaded with the node configuration information, the computing nodes 202 and 212 may be brought online and into service.

Figure 4:
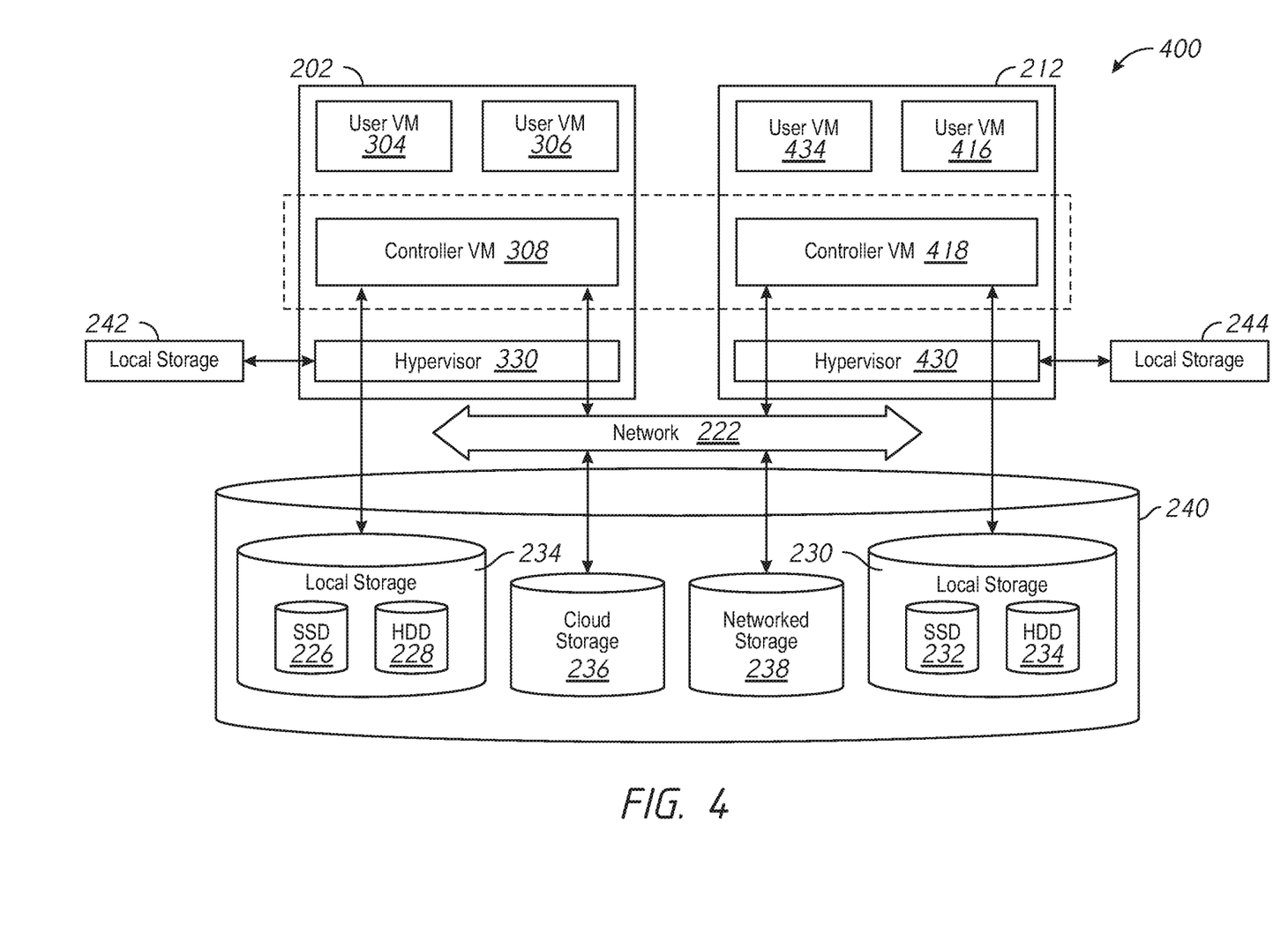
FIG. 4 is a block diagram of a distributed computing system 400 after completion of initialization, in accordance with an embodiment of the present disclosure.

FIG. 4 is a block diagram of a distributed computing system 400 after completion of initialization, in accordance with an embodiment of the present disclosure. The distributed computing system 400 may include elements that have been previously described with respect to the distributed computing system 200 of FIG. 2 and the distributed computing system 300 of FIG. 3. Those elements have been identified in FIG. 4 using the same reference numbers used in FIG. 2 and FIG. 3 and operation of the common elements is as previously described. Consequently, a detailed description of the operation of these particular elements will not be repeated in the interest of brevity.

The computing node 212 may include user VM 414, user VM 416, a controller VM 418, and a hypervisor 430. The user VM 414, user VM 416, the controller VM 418, and the hypervisor 430 may be implemented similarly to analogous components described above with respect to the computing node 202. For example, the user VM 414 and user VM 416 may be implemented as described above with respect to the user VM 304 and user VM 306. The controller VM 418 may be implemented as described above with respect to controller VM 308. The hypervisor 430 may be implemented as described above with respect to the hypervisor 330. In the embodiment of FIG. 4, the hypervisor 330 may be a different type of hypervisor than the hypervisor 430. For example, the hypervisor 330 may be Hyper-V, while the hypervisor 430 may be ESX(i).

The controller VM 308 and controller VM 418 may communicate with one another via the network 222. By linking the controller VM 308 and controller VM 418 together via the network 222, a distributed network of computing nodes including computing node 202 and computing node 212, can be created.

Controller VMs, such as controller VM 308 and controller VM 418, may each execute a variety of services and may coordinate, for example, through communication over network 222. Services running on controller VMs may utilize an amount of local memory to support their operations. For example, services running on controller VM 208 may utilize memory in local memory 242. Services running on controller VM 418 may utilize memory in local memory 244. The local memory 242 and local memory 244 may be shared by VMs on computing node 202 and computing node 212, respectively, and the use of local memory 242 and/or local memory 244 may be controlled by hypervisor 330 and hypervisor 440, respectively. Moreover, multiple instances of the same service may be running throughout the distributed system—e.g. a same services stack may be operating on each controller VM. For example, an instance of a service may be running on controller VM 308 and a second instance of the service may be running on controller VM 418.

Generally, controller VMs described herein, such as controller VM 308 and controller VM 418 may be employed to control and manage any type of storage device, including all those shown in storage 240 of FIGS. 2-4, including local storage 224 (e.g., SSD 226 and HDD 228), cloud storage 236, and networked storage 238. Controller VMs described herein may implement storage controller logic and may virtualize all storage hardware as one global resource pool (e.g., storage 240) that may provide reliability, availability, and performance. IP-based requests are generally used (e.g., by user VMs described herein) to send I/O requests to the controller VMs. For example, user VM 304 and user VM 306 may send storage requests to controller VM 308 using an IP request. Controller VMs described herein, such as controller VM 308, may directly implement storage and I/O optimizations within the direct data access path.

Virtual disks (vDisks) may be structured from the storage devices in storage 240, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 208 may expose one or more vDisks of the storage 240 and may mount a vDisk on one or more user VMs, such as user VM 204 and/or user VM 206.

During operation, user VMs (e.g., user VM 304 and/or user VM 306) may provide storage input/output (I/O) requests to controller VMs (e.g., controller VM 308 and/or hypervisor 330). Accordingly, a user VM may provide an I/O request to a controller VM as an iSCSI and/or NFS request. Internet Small Computer System Interface (iSCSI) generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. Network File System (NFS) refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, user VMs described herein may provide storage requests using an IP based protocol. The storage requests may designate the IP address for a controller VM from which the user VM desires I/O services. The storage request may be provided from the user VM to a virtual switch within a hypervisor to be routed to the correct destination. For examples, the user VM 304 may provide a storage request to hypervisor 330. The storage request may request I/O services from controller VM 308 and/or controller VM 418. If the request is to be intended to be handled by a controller VM in a same service node as the user VM (e.g., controller VM 208 in the same computing node as user VM 304) then the storage request may be internally routed within computing node 202 to the controller VM 308. In some examples, the storage request may be directed to a controller VM on another computing node. Accordingly, the hypervisor (e.g., hypervisor 330) may provide the storage request to a physical switch to be sent over a network (e.g., network 222) to another computing node running the requested controller VM (e.g., computing node 212 running controller VM 418).

Accordingly, controller VMs described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, examples described herein may be advantageously scalable, and may provide advantages over approaches that have a limited number of controllers. Consequently, examples described herein may provide a massively-parallel storage architecture that scales as and when hypervisor computing nodes are added to the system.

Figure 5:
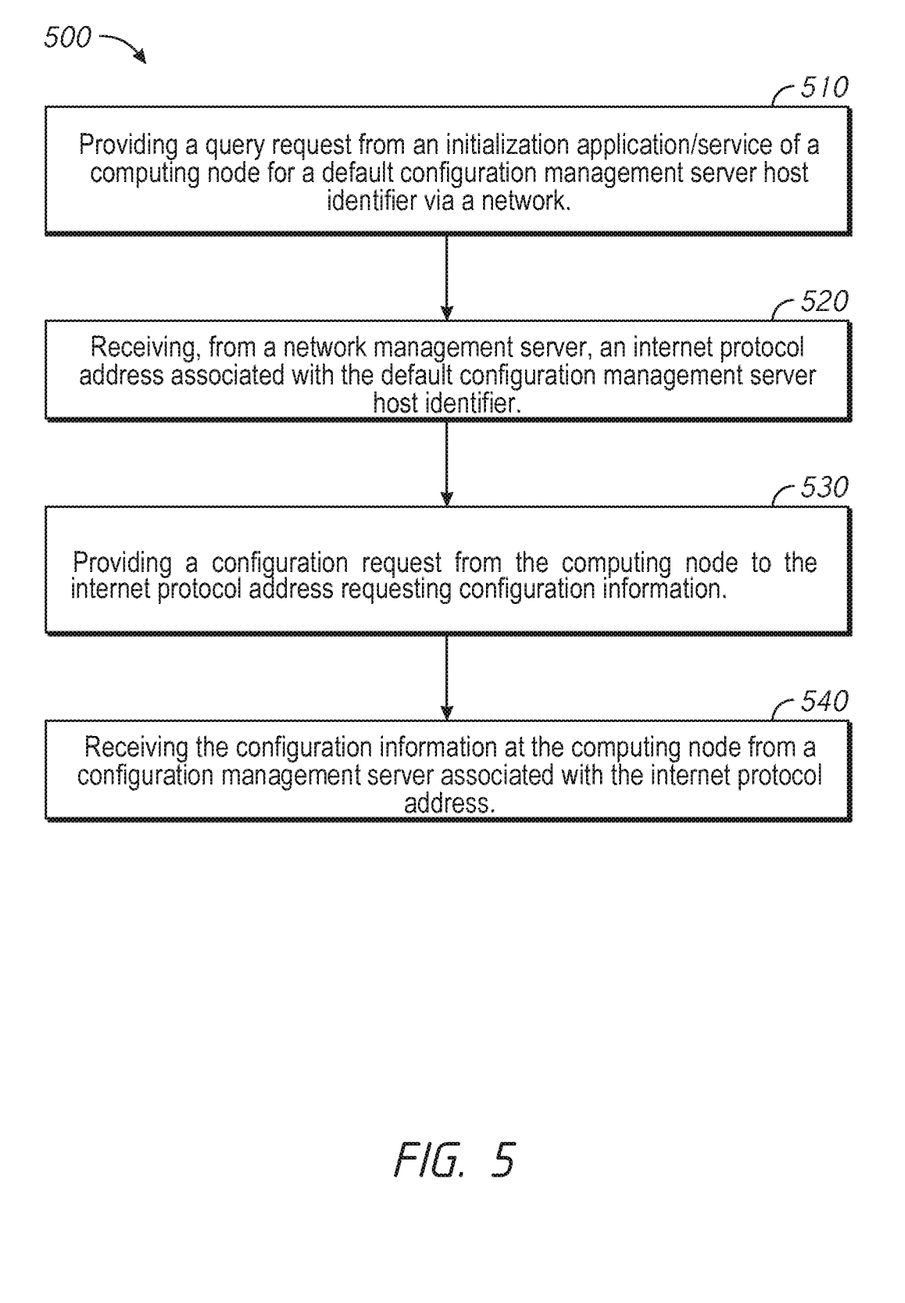
FIG. 5 is a flow diagram illustrating a method for initializing computing nodes of a computing node cluster in accordance with an embodiment of the present disclosure.

FIG. 5 is a flow diagram illustrating a method 500 for initializing computing nodes of a computing node cluster in accordance with an embodiment of the present disclosure. The method 500 may be performed by the computing node closer 110 of FIG. 1 or the distributed computing systems 200, 300, and 400 of FIGS. 2, 3, and 4, respectively.

The method 500 may include providing a query request from an initialization application/service of a computing node for a default configuration management server identifier via a network, at 510. The method 500 may further include receiving, from a network management server, an internet protocol address associated with the default configuration management server host identifier, at 520. The computing node may include the computing node 112 or the second computing node 114 of FIG. 1 or the computing node 202 or the computing node 212 of FIGS. 2, 3, and 4. The network may include the network 140 of FIG. 1 and/or the network 222 of FIGS. 2, 3, and 4. In some examples, the network may include a wide area network, a local area network, or combinations thereof. The network management server may be implemented in the network management server 130 of FIG. 1. The network management server may implement a DHCP. In some examples, the network management server may also include a domain name server. Receiving the internet protocol address associated with the default configuration management server identifier may include receiving the internet protocol address via a field of a dynamic host configuration protocol (DHCP) packet. In some examples, the network may include a virtual network or a wide-area network. In some examples, the method 500 may further include receiving second configuration information associated with a second computing node at the computing node, and providing the second configuration information to the second computing node from the computing node via a local area network. In some examples, the method 500 may include receiving a primary computing node designation at the computing node. The primary computing node designation may configures the computing node to manage provision of the second configuration information to the second computing node.

The method 500 may further include providing a configuration request from the computing node to the internet protocol address requesting configuration information, at 530. The configuration information may include the node configuration information 121 of FIG. 1. Provision of the configuration request from the computing node may include an identifier associated with the computing node. The identifier may include at least one of a model number, a serial number, or a media access control address.

The method 500 may further include receiving the configuration information at the computing node from a configuration management server associated with the internet protocol address, at 540. The configuration management server may include the configuration management server 120 of FIG. 1. In some examples, the configuration information may include software and firmware, support permissions, contracts, assigned policies, and update procedures specific to the application. In some examples, the configuration information and the second configuration information may each include a common software images, such as hypervisor images, operating system images, etc.

Figure 6:
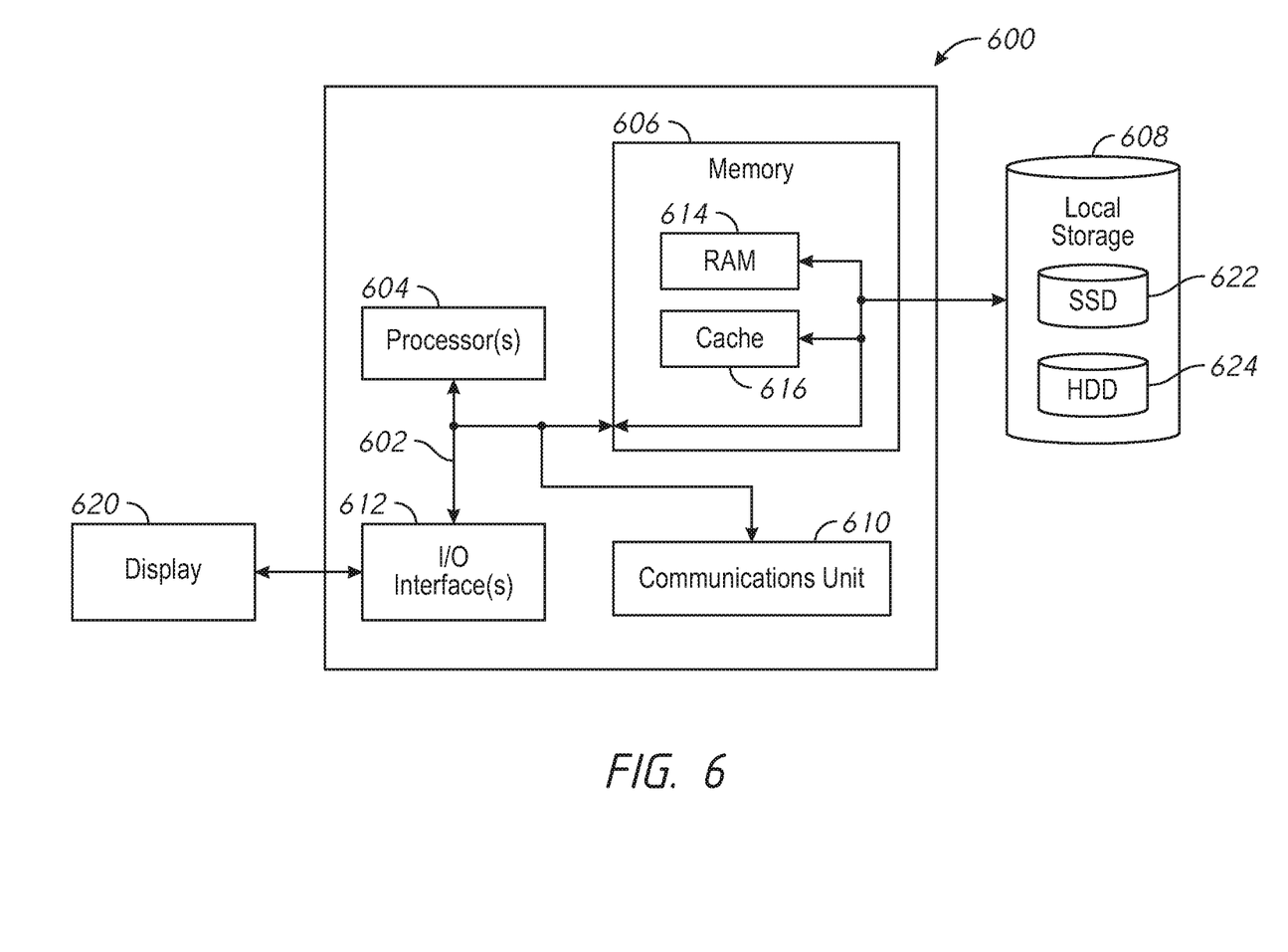
FIG. 6 depicts a block diagram of components of a computing node in accordance with an embodiment of the present disclosure.

FIG. 6 depicts a block diagram of components of a computing node 600 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made. The computing node 600 may implemented as the computing nodes 112 or 114 of FIG. 1, and/or computing nodes 202 and 212 of FIGS. 2-4. The computing node 600 may be configured to implement the method 500 of FIG. 5 described with load data initialize the computing node 600.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 224 and/or local storage network 240 of FIGS. 2-4. In this embodiment, the local storage 608 includes an SSD 622 and an HDD 624, which may be implemented as described above with respect to SSD 226, SSD 232 and HDD 228, HDD 234 respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

What is claimed is:

1. A method comprising:
   providing a query request to join a network from an application running on a hypervisor executing on one or more processors of a computing node, wherein the application is configured to manage allocation of physical resources of the computing node to provide the query request;
   receiving, from a network management server, an internet protocol address associated with a configuration management server;
   providing a configuration request from the computing node to the internet protocol address requesting configuration information for configuring the application of the computing node; and
   receiving the configuration information at the computing node from the configuration management server, wherein the configuration information comprises instructions for configuring the application to set up the computing node as part of a cluster of computing nodes by communicatively linking a virtual machine of the computing node to at least another virtual machine of a second computing node in the cluster of computing nodes.

2. The method of claim 1, further comprising receiving the internet protocol address via a field of a dynamic host configuration protocol (DHCP) message.

3. The method of claim 2, further comprising:
   in response to lack of inclusion of the internet protocol address in the field of the DHCP message, providing a uniform resource locator (URL) associated with a host identifier to a domain name server.

4. The method of claim 1, further comprising:
   receiving, at the computing node, second configuration information associated with the second computing node from the configuration management server.

5. The method of claim 1, wherein the configuration information includes a second internet protocol addresses assigned to the first computing node.

6. The method of claim 1, further comprising receiving a primary computing node designation at the computing node, wherein the primary computing node designation configures the computing node to manage provision of respective configuration information to the second computing node.

7. The method of claim 1, further comprising providing an identifier associated with the computing node with the configuration request, wherein the configuration management server uses the identifier to identify and authenticate the computing node.

8. The method of claim 7, wherein the identifier comprises at least one of a model number, a serial number, or a media access control address.

9. At least one non-transitory computer-readable storage medium including instructions that when executed by one or more processors of a computing node, cause the computing node to:
   load an application image to start an application on a hypervisor executing on the one or more processors of the computing node, wherein the application is configured to manage allocation of physical resources of the computing node;
   after loading the application image, provide a request via the application to connect to a network;
   provide a configuration request via the application to an identifier associated with a configuration management server; and
   receive the configuration information from the configuration management server based on the configuration request, wherein the configuration information comprises instructions for configuring the application of the computing node to set up the computing node as part of a cluster of computing nodes by communicatively linking a virtual machine of the computing node to at least another virtual machine of a second computing node in the cluster of computing nodes.

10. The at least one computer-readable storage medium of claim 9, wherein the instructions that when executed by the computing node, cause the computing node to connect to the network include instructions to send a dynamic host configuration protocol (DHCP) message to connect to the network.

11. The at least one computer-readable storage medium of claim 10, wherein the instructions, further cause the computing node to receive a second DHCP message that includes the identifier associated with the configuration management server.

12. The at least one computer-readable storage medium of claim 11, wherein the instructions, further cause the computing node to retrieve the identifier associated with the configuration management server from a field of a DHCP offer message or a DHCP acknowledge message.

13. The at least one computer-readable storage medium of claim 9, wherein the identifier associated with the configuration management server is an internet protocol address.

14. The at least one computer-readable storage medium of claim 9, wherein the instructions further cause the computing node to provide an identifier associated with the computing node with the configuration request.

15. The at least one computer-readable storage medium of claim 14, wherein the identifier associated with the computing node comprises at least one of a model number, a serial number, or a media access control address.

16. A computing node, the computing node installed with software configured to cause one or more processors of the computing node to perform operations comprising:
   providing a query request to join a network from an application running on a hypervisor executing on the one or more processors of the computing node, wherein the application is configured to manages allocation of physical resources of the computing;
   receiving, from a network management server, a first internet protocol address assigned for communication over the network and a second internet protocol address associated with a configuration management server;
   providing a configuration request from the computing node over the network using the first internet protocol address to the second internet protocol address requesting configuration information for configuring the application of the computing node; and
   receiving the configuration information at the computing node from the configuration management server, wherein the configuration information comprises instructions for configuring the application of the computing node to set up the computing node as part of a cluster of computing nodes by communicatively linking a virtual machine of the computing node to at least another virtual machine of a second computing node in the cluster of computing nodes.

17. The computing node of claim 16, wherein the configuration information includes a third internet protocol address assigned for communication over the network.

18. The computing node of claim 16, wherein the configuration information includes network configuration settings, policies, licenses, support contracts, update procedures, or any combination thereof.

19. The computing node of claim 16, wherein the software is configured to cause the computing node to perform operations comprising receiving the internet protocol address via a field of a dynamic host configuration protocol (DHCP) message.

20. The method of claim 3, further comprising receiving the internet protocol address from the domain name server.

* * * * *

UNITED STATES PATENT AND TRADEMARK OFFICE
CERTIFICATE OF CORRECTION

PATENT NO. : 11,159,367 B2
APPLICATION NO. : 15/980321
DATED : October 26, 2021
INVENTOR(S) : Brian Finn et al.

It is certified that error appears in the above-identified patent and that said Letters Patent is hereby corrected as shown below:

In the Claims

Claim 16, Column 14, Lines 48-49, change:
"the application is configured to manages allocation of physical resources of the computing;"
To:
--the application is configured to manage allocation of physical resources of the computing node;--.

Signed and Sealed this
Fourteenth Day of May, 2024

Katherine Kelly Vidal
*Director of the United States Patent and Trademark Office*